United States Patent
Hu et al.

(10) Patent No.: US 10,101,595 B2
(45) Date of Patent: Oct. 16, 2018

(54) LENS DRIVING DEVICE

(71) Applicant: TDK TAIWAN CORP., Yangmei Taoyuan (TW)

(72) Inventors: Chao-Chang Hu, Yangmei Taoyuan (TW); Shu-Shan Chen, Yangmei Taoyuan (TW); Cheng-Kai Yu, Yangmei Taoyuan (TW); Che-Wei Chang, Yangmei Taoyuan (TW); Chih-Wei Weng, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 23 days.

(21) Appl. No.: 15/465,117

(22) Filed: Mar. 21, 2017

(65) Prior Publication Data
US 2017/0285363 A1  Oct. 5, 2017

Related U.S. Application Data

(60) Provisional application No. 62/314,545, filed on Mar. 29, 2016.

(30) Foreign Application Priority Data

Feb. 15, 2017  (TW) .............................. 106104851 A (51) Int. Cl.
  *G02B 7/09*  (2006.01)
  *G02B 27/64*  (2006.01)
  *H02K 41/035*  (2006.01)

(52) U.S. Cl.
  CPC ............. *G02B 27/646* (2013.01); *G02B 7/09* (2013.01); *H02K 41/0356* (2013.01)

(58) Field of Classification Search
  None
  See application file for complete search history.

(56) References Cited

U.S. PATENT DOCUMENTS

| 2010/0080545 A1* | 4/2010 | Fan ........................ G03B 5/02 |
| | | 396/55 |
| 2011/0122495 A1* | 5/2011 | Togashi ................ G02B 7/023 |
| | | 359/557 |

(Continued)

FOREIGN PATENT DOCUMENTS

| TW | I457693 B | 10/2014 |
| TW | M516172 U | 1/2016 |
| TW | M517951 U | 2/2016 |

OTHER PUBLICATIONS

An Office Action issued in corresponding TW Application No. 106104851 dated May 21, 2018, 8 pages.

*Primary Examiner* — Wb Perkey
(74) *Attorney, Agent, or Firm* — Muncy, Geissler, Olds & Lowe, P.C.

(57) ABSTRACT

A lens driving device includes a base and a frame movably connected to the base. A holder carries a lens and is movably disposed in the frame. A focus driving unit includes at least one first coil disposed on the holder and at least one first magnetic element disposed on the frame and corresponding to the first coil. Electromagnetic induction occurs between the first coil and the first magnetic element, so that the holder is moved along an optical axis of the lens with respect to the base. A tilt driving unit includes several first electromagnetic driving parts disposed on opposite sides of the holder and several second electromagnetic driving parts disposed on the frame and corresponding to the first electromagnetic driving parts. Electromagnetic induction occurs between the first and second electromagnetic driving parts, so that the holder is tilted with respect to the base.

20 Claims, 10 Drawing Sheets

(56) References Cited

U.S. PATENT DOCUMENTS

| | | | |
|---|---|---|---|
| 2011/0150442 A1* | 6/2011 | Ollila | G03B 3/10 |
| | | | 396/55 |
| 2014/0205274 A1* | 7/2014 | Wu | G02B 27/646 |
| | | | 396/55 |
| 2015/0293372 A1* | 10/2015 | Hamada | G03B 5/00 |
| | | | 359/557 |
| 2016/0048002 A1* | 2/2016 | Cheng | G02B 7/09 |
| | | | 359/557 |
| 2016/0301875 A1* | 10/2016 | Iwasaki | G02B 7/09 |
| 2017/0010475 A1* | 1/2017 | Minamisawa | H02K 33/18 |
| 2017/0045753 A1* | 2/2017 | Enta | G02B 7/04 |
| 2017/0176710 A1* | 6/2017 | Peng | G02B 7/09 |
| 2017/0235155 A1* | 8/2017 | Minamisawa | G02B 7/023 |
| | | | 359/557 |
| 2017/0285363 A1* | 10/2017 | Hu | H02K 41/0356 |
| 2018/0120532 A1* | 5/2018 | Murakami | G02B 7/09 |

* cited by examiner

LENS DRIVING DEVICE

CROSS REFERENCE TO RELATED APPLICATIONS

The present application claims priorities of U.S. Provisional Application No. 62/314,545, filed on Mar. 29, 2016, and Taiwan Patent Application No. 106104851, filed on Feb. 15, 2017, the entirety of which are incorporated by reference herein.

BACKGROUND OF THE INVENTION

Field of the Invention

The invention relates to a lens driving device, and in particular to a lens driving device with a rotation correction/compensation function.

Description of the Related Art

Many handheld digital products such as cameras, cell phones, and tablet PCs are equipped with digital camera functionality as a basic requirement nowadays, and this is possible thanks to the miniaturization of lens driving devices.

When using a handheld digital product, the lens driving device therein may vibrate due to external shock or impact, which can blur the images captured by the lens driving device. Taiwan patent no. I457693 discloses a conventional optical image stabilization device. When the autofocus function is executed, a current is supplied to the coil, and electromagnetic induction occurs between the coil and the respective magnets, so that the holder fixed to the coil is moved along the optical axis (i.e. the Z direction/axis) of the lens, thereby performing an autofocus function. Moreover, two displacement sensors are provided in the optical image stabilization device to detect the position of the optical axis in the X and Y directions. When the optical axis deviates from the norm, electromagnetic induction can occur between the coils and the magnets, corresponding to the X and Y directions, so as to correct the position of the lens (i.e. correct the horizontal offset of the optical axis in the X and Y directions). Consequently, the device is shockproof and image quality is improved.

As described above, conventional optical image stabilization devices have been able to effectively correct (or compensate) for the offset of the lens and its optical axis in the vertical direction (the direction of the optical axis) and in the horizontal direction (the direction perpendicular to the optical axis) due to shock. However, the vibration of the lens driving device is actually more complicated, rather than being offset in the X and Y directions, when the handheld digital product is in use. It is therefore desirable to provide a lens driving device with better shockproofing.

BRIEF SUMMARY OF THE INVENTION

In view of the aforementioned problems, one object of the invention is to provide a lens driving device with a rotation correction/compensation function, which can correct (or compensate) for not only the offset of the lens and its optical axis in the vertical direction (the Z direction) and the horizontal direction (the X and Y directions) due to shock but also the rotation of the lens in the X or Y direction, thereby better protecting the device against shock and improving the image quality.

In accordance with some embodiments, a lens driving device is provided. The lens driving device includes a base, a frame, a holder, a lens driving unit, and a tilt driving unit. The frame is movably connected to the base. The holder is used to carry a lens and movably disposed in the frame. The lens driving unit includes at least one first coil and at least one first magnetic element. The first coil is disposed on the holder. The first magnetic element is disposed on the frame and corresponds to the first coil. Electromagnetic induction occurs between the first coil and the first magnetic element, so that the holder is moved along an optical axis of the lens with respect to the base. The tilt driving unit includes several first electromagnetic driving parts and several second electromagnetic driving parts. The first electromagnetic driving parts are disposed on opposite sides of the holder. The second electromagnetic driving parts are disposed on the frame and correspond to the first electromagnetic driving parts. Electromagnetic induction occurs between the first and second electromagnetic driving parts, so that the holder is tilted with respect to the base.

In accordance with some embodiments, the first electromagnetic driving parts are driving coils each having an elliptical structure, and the second electromagnetic driving parts are driving magnets.

In accordance with some embodiments, the first coil and the first electromagnetic driving parts are disposed on the holder and are partially overlapping when viewed along the optical axis.

In accordance with some embodiments, the focus driving unit includes several first magnetic elements disposed on opposite sides of the frame and corresponding to the driving magnets (the second electromagnetic driving parts) of the tilt driving unit.

In accordance with some embodiments, the driving magnets (the second electromagnetic driving parts) are multi-polar magnets, and each of the first magnetic elements and the respective driving magnet are integrally formed in one piece as a multi-polar magnet.

In accordance with some embodiments, the multi-polar magnet (integrally formed by one of the first magnetic elements and the respective driving magnet) has a plurality of magnetic domains of different sizes in the direction of the optical axis. The driving coil (the first electromagnetic driving part) corresponding to the multi-polar magnet has an upper half portion and a lower half portion which correspond to the magnetic domains, respectively.

In accordance with some embodiments, the current flowing into the driving coils (the first electromagnetic driving parts) disposed on opposite sides of the holder have the same or opposite current directions.

In accordance with some embodiments, the lens driving device further includes an elastic member connecting the holder to the frame. The elastic member includes several holder connection portions connected to the holder, and the holder connection portions located on opposite sides of the holder determine at least one rotation axis of the holder.

In accordance with some embodiments, the rotation axes are arranged in a cross shape, and the optical axis passes through the intersection of the rotation axes.

In accordance with some embodiments, the driving magnets (the second electromagnetic driving parts) are ordinary magnets, and each of the first magnetic elements and the respective driving magnet are integrally formed in one piece as an ordinary magnet. The ordinary magnet (integrally formed by one of the first magnetic elements and the respective driving magnet) has a single magnetic domain in the direction of the optical axis. The magnetic domain corresponds to the first coil and a portion of the respective driving coil (the respective first electromagnetic driving part).

In accordance with some embodiments, the lens driving device further includes a substrate disposed on the base. The substrate has several second coils corresponding to the multi-polar magnets (integrally formed by the first magnetic elements and the respective second electromagnetic driving parts), respectively. Electromagnetic induction occurs between the second coils and the multi-polar magnets, so that the frame is moved along a direction perpendicular to the optical axis with respect to the base.

In accordance with some embodiments, the lens driving device further includes a substrate disposed on the base. The substrate has several second coils corresponding to the ordinary magnets (integrally formed by the first magnetic elements and the respective second electromagnetic driving parts), respectively. Electromagnetic induction occurs between the second coils and the ordinary magnets, so that the frame is moved along a direction perpendicular to the optical axis with respect to the base.

In accordance with some embodiments, the first coil, the first electromagnetic driving parts, and the second coils correspond to the multi-polar magnets (integrally formed by the first magnetic elements and the respective second electromagnetic driving parts).

In accordance with some embodiments, the first coil and each of the first electromagnetic driving parts correspond to a face of the respective multi-polar magnet (integrally formed by one of the first magnetic elements and the respective second electromagnetic driving part) which is parallel to the optical axis.

In accordance with some embodiments, each of the second coils corresponds to another face of the respective multi-polar magnet (integrally formed by one of the first magnetic elements and the respective second electromagnetic driving part) which is perpendicular to the optical axis.

In accordance with some embodiments, the lens driving device further includes several suspension wires for suspending the frame and the holder therein on the base.

In accordance with some embodiments, the lens driving device further includes an elastic member which is a spring sheet having several spring sheet portions. The spring sheet portions are electrically connected to the first coil of the focus driving unit and electrically connected to the first electromagnetic driving parts of the tilt driving unit.

In accordance with some embodiments, the lens driving device further includes several stopper mechanisms formed between the frame and the holder, and the stopper mechanisms are arranged in another cross shape.

In accordance with some embodiments, the cross shape formed by the stopper mechanisms and the cross shape formed by the rotation axes do not overlap, and have an angle therebetween, the angle not being zero.

In accordance with some embodiments, the rotation axes are parallel to or perpendicular to the faces of the second electromagnetic driving parts corresponding to the first electromagnetic driving parts.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

A detailed description is given in the following embodiments with reference to the accompanying drawings. This description is made for the purpose of illustrating the general principles of the invention and should not be taken in a limiting sense.

In the following detailed description, the orientations of "on", "above", "under", and "below" are used for representing the relationship between the relative positions of each element as illustrated in the drawings, and are not meant to limit the invention.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity. Furthermore, some elements not shown or described in the embodiments have the forms known by persons skilled in the field of the invention.

Figure 1:
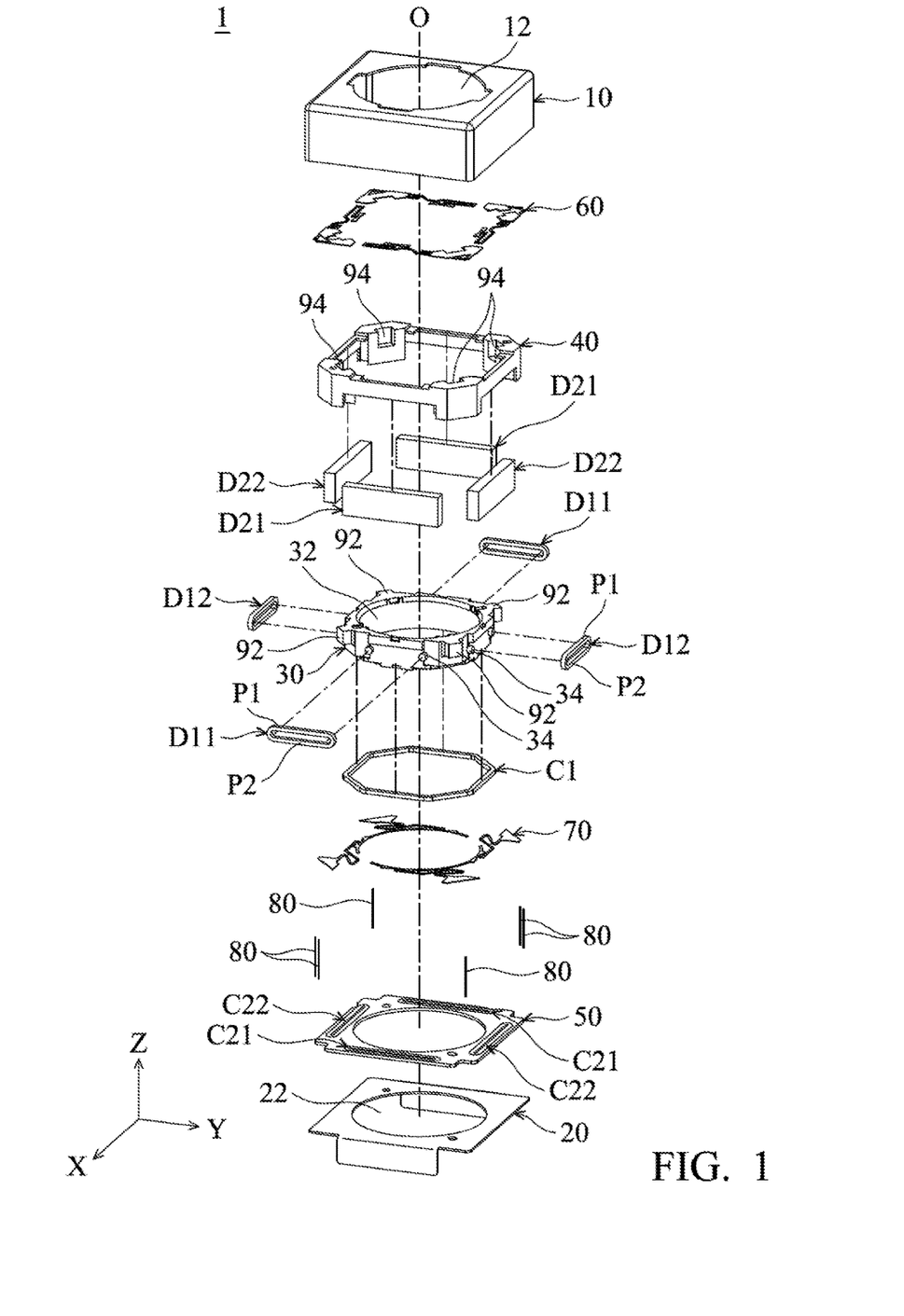
FIG. 1 is an exploded view of a lens driving device in accordance with an embodiment of the invention.
Figure 2:
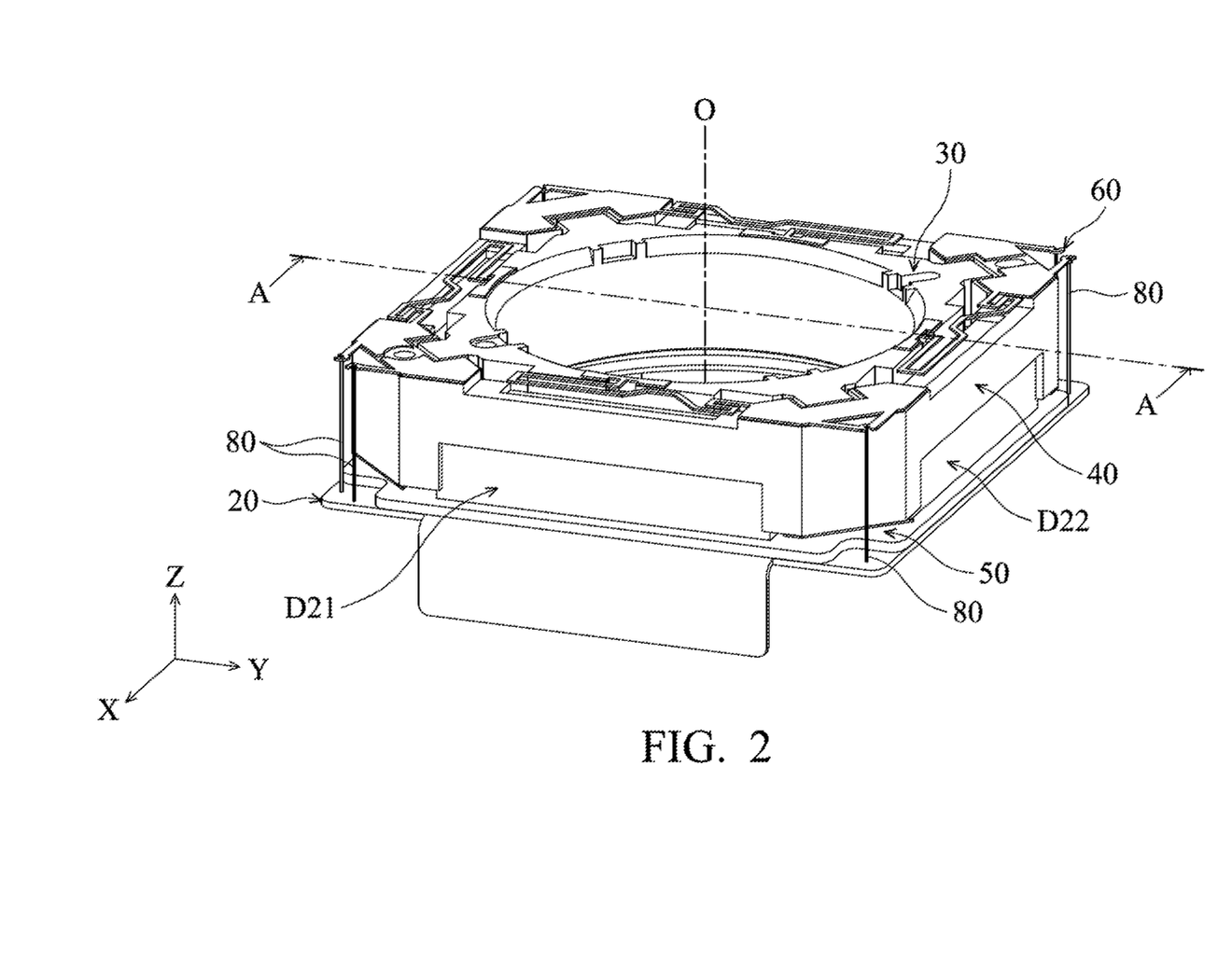
FIG. 2 is a perspective view of a part of the lens driving device (except for the top casing) in FIG. 1 after assembly.
Figure 3:
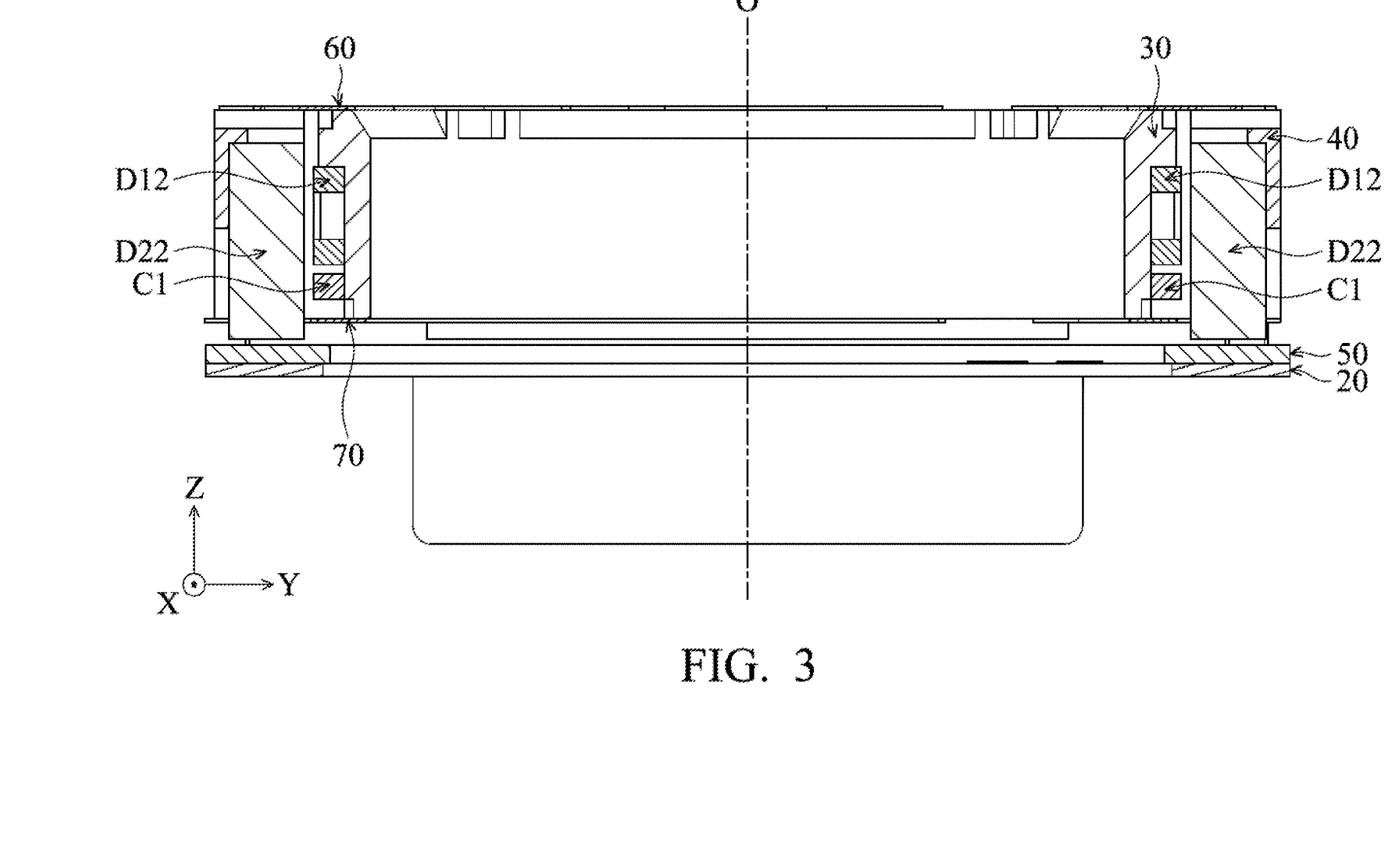
FIG. 3 is a cross-sectional view taken along the line A-A in FIG. 2.

Referring to FIGS. 1, 2, and 3, a lens driving device 1 in accordance with an embodiment of the invention, such as a Voice Coil Motor (VCM), may be disposed in a handheld digital product (for example, a camera, a cell phone, or a tablet PC) to carry and drive a lens (not shown). The lens driving device 1 includes a top casing 10, a base 20, a holder 30, a frame 40, a substrate 50, an upper spring sheet 60, a lower spring sheet 70, several suspension wires 80, a first coil C1, several second coils C21 and C22, several first electromagnetic driving parts D11 and D12, and several second electromagnetic driving parts D21 and 22.

In this embodiment, the top casing 10 has a cubic appearance and the bottom thereof is open (this cannot be seen in FIG. 1 due to the restricted viewing angle). The top casing 10 and the (square) base 20 can be combined (for example, through engagement structures or by means of adhesion) to form a receiving space for accommodating the other components of the lens driving device 1 described above. The shapes of the top casing 10 and the base 20 are not limited to this embodiment and are adjustable according to actual requirements.

As shown in FIG. 1, a top casing opening 12 and a base opening 22 are respectively formed on the top casing 10 and the base 20. The centers of the top casing opening 12 and the base opening 22 are located on an (image-capturing) optical axis O of the lens (not shown), and the base opening 22 faces an image sensing element (for example, a Charge-Coupled Device (CCD), not shown) below it. Thus, the lens can capture light from the outside through the top casing opening 12, and the image sensing element can receive a light signal from the lens through the base opening 22 and convert the light signal into an electronic signal. Then, the electronic signal can be processed through an external circuit system (not shown) to generate a digital image (i.e. achieving a camera function).

Figure 6:
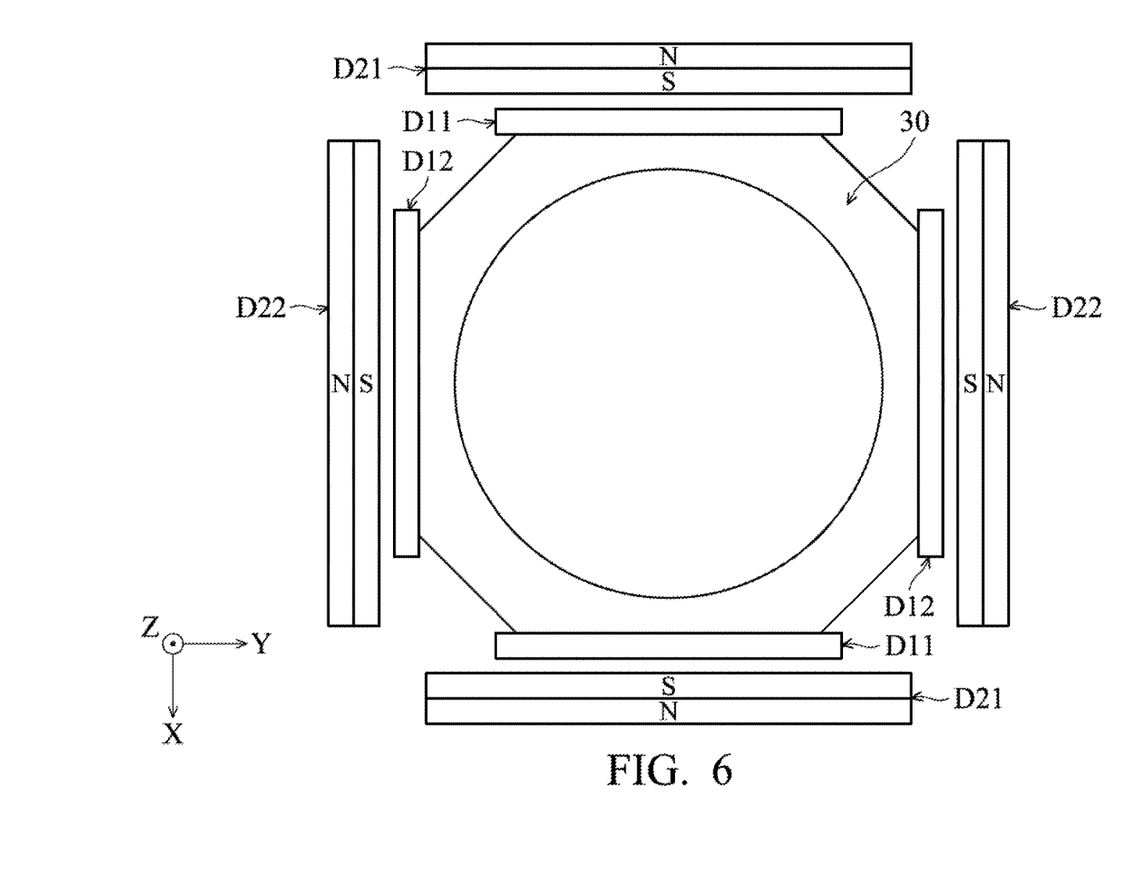
FIG. 6 is a schematic top view showing the relative positions of the holder, the first electromagnetic driving parts, and the second electromagnetic driving parts.

The holder 30 has a through hole 32 for receiving the lens (not shown), wherein the through hole 32 and the lens may be provided with corresponding thread structures (not shown), such that the lens can be locked in the through hole 32. The first coil C1 is wound around the outer peripheral surface of the holder 30. As shown in FIG. 1 and FIG. 6, in this embodiment, the holder 30 has a substantially octagonal shape and the first coil C1 conforms to the shape of the holder 30 to have an octagonal shape when viewed along the optical axis O. In some embodiments, the first coil C1 also conforms to the shape of the holder 30 to have a rectangular, a square, a hexagonal, or other polygonal shape.

Figure 4:
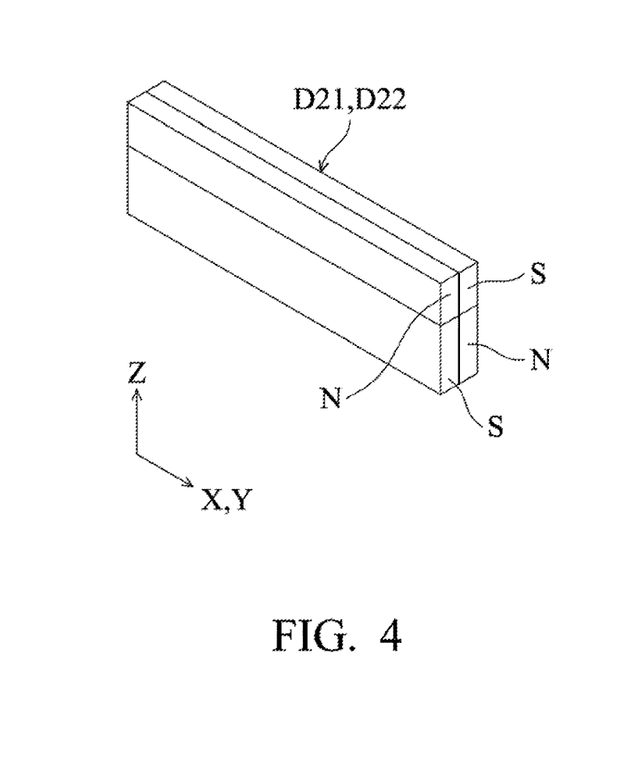
FIG. 4 is a perspective view of a second electromagnetic driving part (multi-polar magnet) in FIG. 1.
Figure 5:
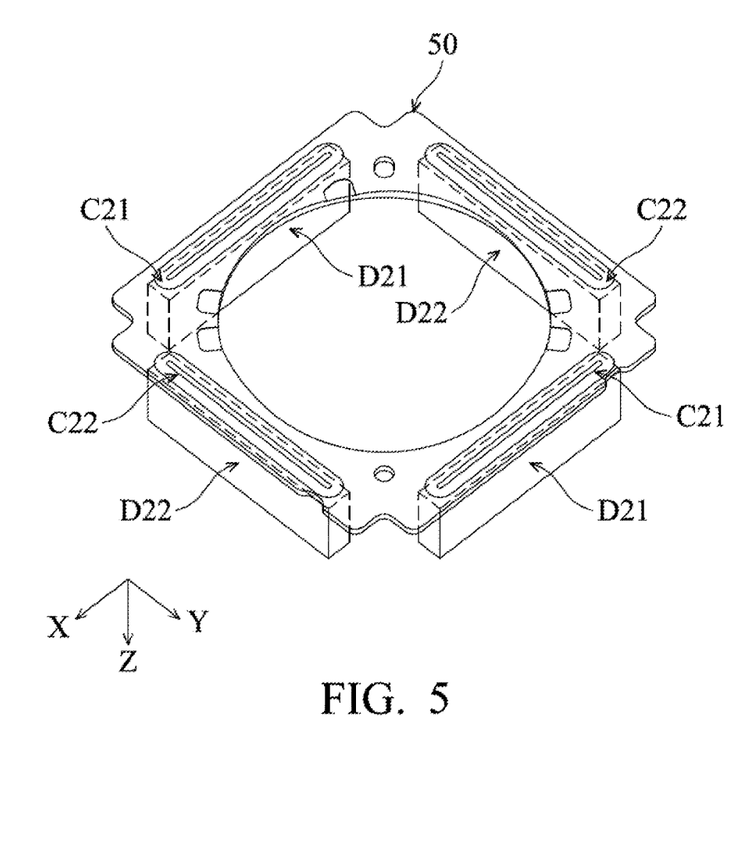
FIG. 5 is a perspective view showing the relative positions of the second coils and the second electromagnetic driving parts.

As shown in FIG. 1 and FIG. 3, the holder 30 and the first coil C1 thereon are disposed in the frame 40. In this embodiment, the frame 40 has an octagonal shape corresponding to the shape of the holder 30, but it may also have a rectangular, a square, a hexagonal, or other polygonal shape. Two pairs of second electromagnetic driving parts D21 and 22 (each having a long plate structure) are disposed on the frame 40 along the X and Y directions and correspond to the first coil C1. In this embodiment, the second electromagnetic driving parts D21 and 22 are driving magnets, such as multi-polar permanent magnets (see FIG. 4), and the upper portion and the lower portion of each second electromagnetic driving part D21 or D22 form two sets of magnetic poles (also known as two magnetic domains) having opposite pole directions (i.e. N-S and S-N) along the direction perpendicular to the X or Y direction. In addition, the second electromagnetic driving parts D21 and D22 are affixed to the inside of four sidewalls of the frame 40 extending in the X and Y directions by adhesive, for example. The position of the first coil C1 on the holder 30 corresponds to the lower magnetic domains of the second electromagnetic driving parts D21 and D22 (see FIG. 7).

In some embodiments, the frame 40 comprises a non-conductive material (such as plastic) or a magnetically permeable material (such as nickel-iron alloy). When the frame 40 is made of a magnetically permeable material, the structural strength thereof is improved and the magnetic internal circulation can be better.

With the above configuration, when the autofocus function of the lens driving device 1 is executed, a current from an external power source (not shown) is supplied to the first coil C1, and electromagnetic induction occurs between the first coil C1 and the second electromagnetic driving parts D21 and D22 (driving magnets). Hence, the holder 30 connected to the first coil C1 can move back and forth (as indicated by the double headed arrow A1 in FIG. 7) along the optical axis O with respect to the base 20 to achieve the rapid focusing of the lens. In this embodiment, the first coil C1 and the second electromagnetic driving parts D21 and D22 constitute a focus driving unit of the lens driving device 1.

Moreover, the holder 30 and the lens therein can be suspended in the center of the frame 40 by the upper spring sheet 60 and the lower spring sheet 70 (for example, two metal sheets) comprising an elastic material. As shown in FIG. 1 and FIG. 3, the upper spring sheet 60 connects the top of the holder 30 to the top of the frame 40, and the lower spring sheet 70 connects the bottom of the holder 30 to the bottom of the frame 40. As a result, when the frame 40 is impacted by an external force, the holder 30 can move with respect to the frame 40 along the optical axis O (the Z direction/axis) through the upper and lower spring sheets 60 and 70, and the vibration of the lens in the vertical direction (the direction of the optical axis O) can thus be effectively absorbed, so as to avoid unintentional damage to the holder 30 and the lens therein. Also, the upper and lower spring sheets 60 and 70 can limit the range in which the holder 30 can be moved along the optical axis O when focusing the lens. In some embodiments, the holder 30 can be elastically suspended in the center of the frame 40 by a single upper spring sheet 60 or a lower spring sheet 70.

Referring to FIGS. 1, 2, 3, and 5, a substantially square substrate 50 is disposed on the base 20 and has two pairs of second coils C21 and C22 (each having an elliptical structure) extending in the X and Y directions, respectively. In this embodiment, the substrate 50 is a flexible printed circuit board, and the second coils C21 and C22 are formed on the surface of the substrate 50 or embedded in the substrate 50, respectively corresponding to the four second electromagnetic driving parts D21 and D22 (driving magnets) on the frame 40. It can be seen from FIG. 1 and FIG. 5 that each of the second coils C21 and C22 corresponds to a face of the respective second electromagnetic driving part D21 or D22, and the face is perpendicular to the optical axis O (i.e. the Z direction).

Although not shown, two magnetic field sensing elements are respectively mounted on two sides of the substrate 50 extending in the X and Y directions. The two magnetic field sensing elements may be Hall effect sensors, MR sensors, or Fluxgate sensors, and can be used to detect the magnetic field change caused by the movement of the two respective second electromagnetic driving parts D21 and D22 on the frame 40, thereby determining the amount of displacement of the frame 40 with respect to the substrate 50 (and the base 20) in the X and Y directions.

As shown in FIG. 1 and FIG. 2, six suspension wires 80 are connected between the frame 40 and the base 20, wherein one end of each suspension wire 80 is connected to the upper spring sheet 60 which connects to the frame 40 by soldering, for example, and the other end is connected to the base 20 by soldering, for example. In this way, the suspension wires 80 can suspend the frame 40 and the holder 30 therein on the base 20. Thus, when the frame 40 is impacted by an external force, the frame 40, the holder 30, and the lens therein can move with respect to the base 20 along the direction perpendicular to the optical axis O (i.e. parallel to the XY plane), and the vibration of the lens in the horizontal direction can be efficiently absorbed. The suspension wires 80 may comprise an elastic material (such as thin and elastic metal rod), and the number thereof can be adjusted according to actual requirements.

In some embodiments, the base 20 is also electrically connected to the first coil C1 wound around the outer peripheral surface of the holder 30 through the suspension wires 80 and the upper spring sheet 60, and the base 20 is electrically connected to an external power source (not shown).

Furthermore, when the frame 40 is impacted by an external force and the optical axis O of the lens is displaced with respect to the substrate 50 (and the base 20), the horizontal displacement (parallel to the XY plane) between the frame 40 and the substrate 50 can be detected by the magnetic field sensing elements on the substrate 50, and the amount of deviation of the of the optical axis O can thus be determined. To correct the lens and its optical axis O to the right position, a current is supplied to the second coils C21 positioned in the X direction, and electromagnetic induction occurs between the second coils C21 and the respective second electromagnetic driving parts D21 (driving magnets), so that the second electromagnetic driving parts D21 and the frame 40 are moved along the X direction with respect to the substrate 50 and the base 20. Similarly, when a current is supplied to the second coils C22 positioned in the Y direction, electromagnetic induction occurs between the second coils C22 and the respective second electromagnetic driving parts D22 (driving magnets), so that the second electromagnetic driving parts D22 and the frame 40 are moved along the Y direction with respect to the substrate 50 and the base 20. Accordingly, the lens and its optical axis O can be controlled to move along the XY plane for rapid displacement compensation, and image blur can be effectively suppressed. In this embodiment, the second coils C21 and C22 and the second electromagnetic driving parts D21 and D22 constitute an anti-shaking unit of the lens driving device 1. The anti-shaking unit and the focus driving unit share the second electromagnetic driving parts D21 and D22 (multi-polar magnets).

Referring to FIGS. 1, 3, 6, and 7, the outer peripheral surface of the holder 30 has several protrusions 34 formed thereon. The first electromagnetic driving parts D11 and 12 are driving coils each having an elliptical structure. Specifically, one pair of first electromagnetic driving parts D11 are affixed to the sidewalls of opposite sides of the holder 30 in the X direction by surrounding the protrusions 34, and correspond to one pair of second electromagnetic driving parts D21 on the frame 40. The other pair of first electromagnetic driving parts D12 are affixed to the sidewalls of opposite sides of the holder 30 in the Y direction by surrounding the protrusions 34, and correspond to one pair of second electromagnetic driving parts D22 on the frame 40. In this embodiment, the first coil C1 and each of the first electromagnetic driving parts D11 and D22 correspond to one face of the respective second electromagnetic driving part D21 or D22, and the face is parallel to the optical axis O (see FIG. 3).

Figure 7:
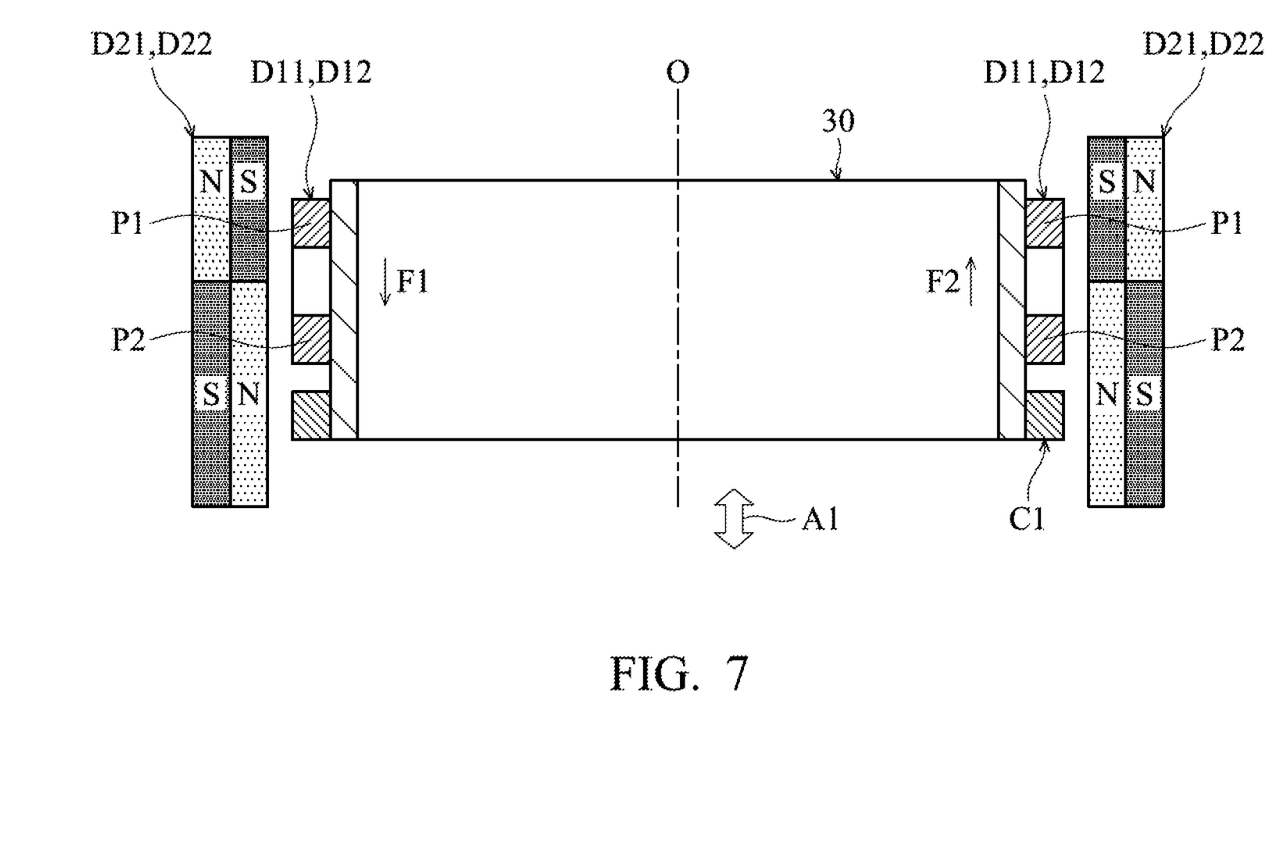
FIG. 7 is a schematic side view showing the relative positions of the holder, the first coil, the first electromagnetic driving parts, and the second electromagnetic driving parts.

As shown in FIG. 1 and FIG. 7, each of the first electromagnetic driving parts D11 and D22 (elliptical driving coils) has an upper half portion P1 and a lower half portion P2 extending in the X or Y direction (the upper and lower half portions P1 and P2 of the first electromagnetic driving parts D11 extend in the Y direction, and the upper and lower half portions P1 and P2 of the first electromagnetic driving parts D12 extend in the X direction). Moreover, the upper and lower half portions P1 and P2 of each of the first electromagnetic driving parts D11 and D22 correspond to different magnetic domains, in the direction of the optical axis O, of the adjacent second electromagnetic driving part D21 or D22 (multi-polar magnet). In this embodiment, the two magnetic domains (upper and lower magnetic domains) of each of the second electromagnetic driving parts D21 and D22 in the direction of the optical axis O have different sizes (see FIG. 7), wherein the lower magnetic domain is larger than the upper magnetic domain, and the lower magnetic domain corresponds to the first coil C1 and the lower half portions P2 of the first electromagnetic driving parts D11 and D12.

Referring to FIG. 7, although the first electromagnetic driving parts D11 and D12 are mounted on the upper side (with respect to the first coil C1) of the holder 30 in this embodiment, the first electromagnetic driving parts D11 and D12 may also be mounted on the lower side (with respect to the first coil C1) of the holder 30, as long as the second electromagnetic driving parts D21 and D22 are placed upside down accordingly.

In this embodiment, the second electromagnetic driving parts D21 and D22 (multi-polar magnets) located on opposite sides of the holder 30 have the same magnetic domain configuration with respect to the adjacent first electromagnetic driving parts D11 and D12 (driving coils). For example, the magnetic domains corresponding to the upper half portions P1 of the first electromagnetic driving parts D11 and D12 all include inner S poles and outer N poles, and the magnetic domains corresponding to the lower half portions P2 of the first electromagnetic driving parts D11 and D12 all include inner N poles and outer S poles. In some embodiments, the pole directions of the upper and lower magnetic domains can also be reversed.

With the above configuration, when the current flowing into the first electromagnetic driving parts D11 and D12 (driving coils) disposed on opposite sides of the holder 30 have opposite current directions, two electromagnetic induction forces F1 and F2 (see FIG. 7) which are parallel to the optical axis O and in the opposite directions are generated between the first electromagnetic driving parts D11 and D12 and the second electromagnetic driving parts D21 and D22 located on opposite sides of the holder 30, so as to tilt the holder 30 (in the frame 40) with respect to the base 20. In this embodiment, the first electromagnetic driving parts D11 and D12 and the second electromagnetic driving parts D21 and D22 constitute a tilt driving unit of the lens driving device 1.

Figure 8:
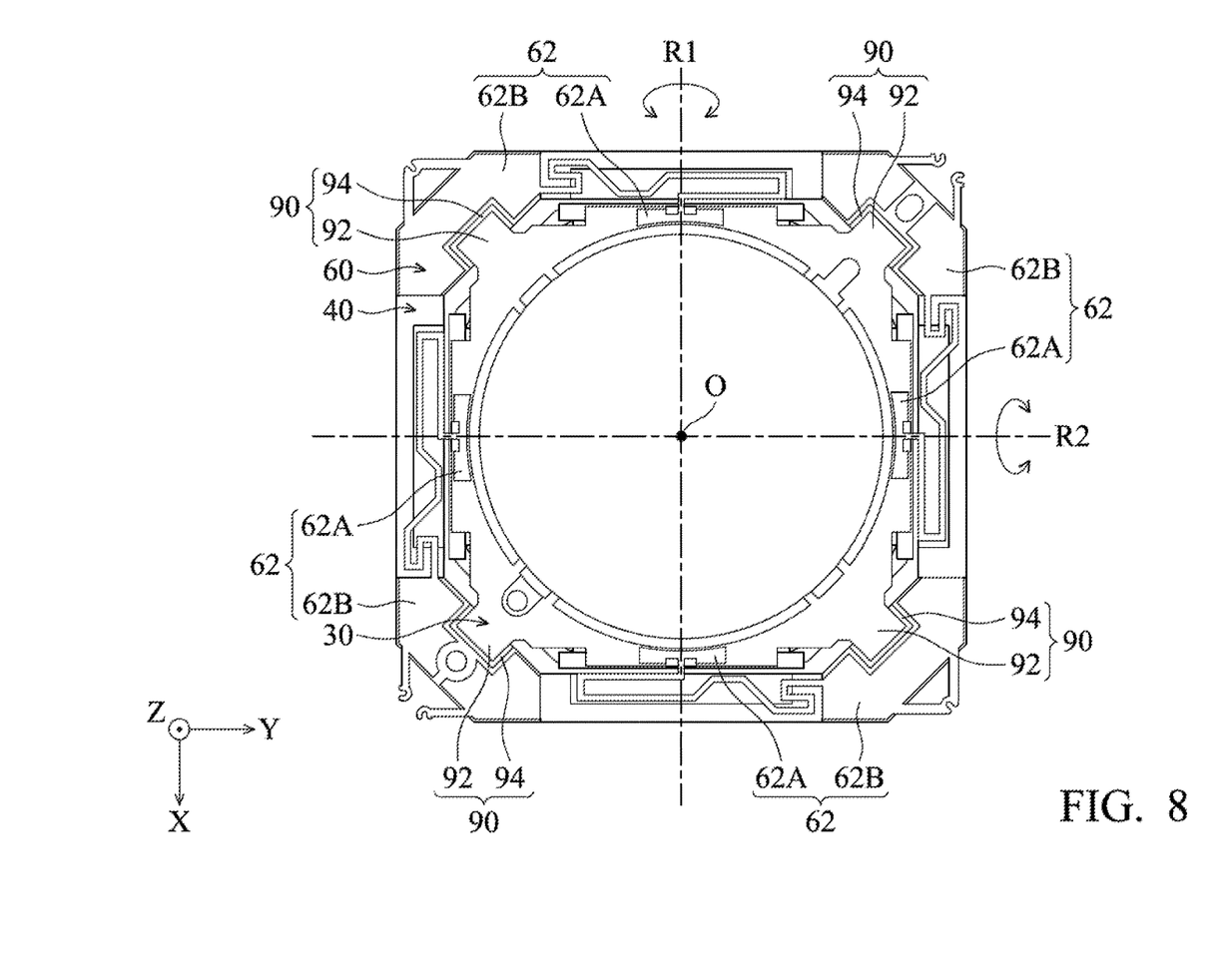
FIG. 8 is a perspective view showing the relative positions of the upper spring sheet, the holder, and the frame.

Referring to FIG. 8, the upper spring sheet 60 (elastic member) are divided into several (e.g. four) spring sheet portions 62. Each of the spring sheet portions 62 has a holder connection portion 62A connected to the holder 30 and a frame connection portion 62B connected to the frame 40. The holder connection portions 62A affixed to the holder 30 may be regarded as rotation fulcrums of the holder 30, and the holder connection portions 62A located on opposite sides of the holder 30 determine one rotation axis R1 and another rotation axis R2 of the holder 30 (for example, the two holder connection portions 62A in the X direction determine the rotation axis R1, and the two holder connection portions 62A in the Y direction determine the rotation axis R2). As shown in FIG. 8, the rotation axis R1 is parallel to the X direction, and the rotation axis R2 is parallel to the Y direction. Moreover, the rotation axes R1 and R2 are arranged in a cross shape, and the optical axis O passes through the intersection of the rotation axes R1 and R2. As shown in FIG. 6 and FIG. 8, the rotation axes R1 and R2 are parallel to or perpendicular to the faces of the second electromagnetic driving parts D21 and D22 corresponding to the first electromagnetic driving parts D11 and D12. In some embodiments, the features of the holder connection portions 62A are also applied to the lower spring sheet 70.

With the above configuration, when a current is supplied to the first electromagnetic driving parts D12 (in the Y direction) on opposite sides of the holder 30, electromagnetic induction occurs between the first electromagnetic driving parts D12 and the respective second electromagnetic driving parts D22, so that the holder 30 rotates about the rotation axis R1 (i.e. X direction/axis). Similarly, when a current is supplied to the first electromagnetic driving parts D11 (in the X direction) on opposite sides of the holder 30, electromagnetic induction occurs between the first electromagnetic driving parts D11 and the respective second electromagnetic driving parts D21, so that the holder 30 rotates about the rotation axis R2 (i.e. Y direction/axis). In some embodiments, the first electromagnetic driving parts D12 are electrically connected to the base 20 through the two spring sheet portions 62 of the upper spring sheet 60 and the two suspension wires 80, and the first electromagnetic driving parts D11 are electrically connected to the base 20 through the other two spring sheet portions 62 of the upper spring sheet 60 and the other two suspension wires 80, and the base 20 is electrically connected to an external power source (not shown).

Furthermore, several stopper mechanisms 90 may be formed between the frame 40 and the holder 30 for limiting the rotation angle of the holder 30. For example, as shown in FIG. 1 and FIG. 8, the four corners of the holder 30 form several outwardly extending protrusions 92, and the frame 40 forms several recesses 94 corresponding to the four protrusions 92, the shape of the recesses 94 corresponding to that of the protrusions 92. Hence, when the tilt driving unit drives the holder 30 to rotate, the protrusions 92 and the recesses 94 (constituting the stopper mechanisms 90) can limit the rotation angle of the holder 30, thereby preventing the holder 30 from being tilted arbitrarily or over-tilted with respect to the base 20. In this embodiment, several stopper mechanisms 90 are also arranged in a cross shape, and this cross shape and the cross shape formed by the rotation axes R1 and R2 do not overlap, and have an angle therebetween, wherein the angle is not zero (preferably 45 degrees, as shown in FIG. 8), so that the holder 30 is evenly stopped at a specific angle, rather than being tilted arbitrary with respect to the base 20. In some embodiments, the positions of the protrusions 92 and the recesses 94 can also be exchanged, that is, the protrusions 92 are formed on the frame 40, and the recesses 94 are formed on the holder 30.

As described above, the lens driving device 1 can correct (or compensate) for not only the offset of the lens and its optical axis in the vertical direction (the Z direction) and the horizontal direction (the X and Y directions) due to shock but also the rotation of the lens in the X or Y direction.

For example, when using a handheld digital product, the (lens) holder therein may be tilted with respect to the base due to shock (or external impact). At this time, the tilting of the lens and its optical axis can be corrected by the motion of the holder 30 rotating about the rotation axis R1 or R2, thereby improving the image quality of the digital product. In addition, when the lens is assembled with the holder, parts tolerance and assembly method etc. may also cause the lens and its optical axis to be tilted. With the above-mentioned rotation correction/compensation function, the defects in manufacturing can also be eliminated, so that the product yield is improved.

The lens driving device 1 described above can only achieve 5 axes (X axis, Y axis, Z axis, rotation axis R1 and/or ration axis R2) correction/compensation, however, by having more groups (three, four, or more groups) of first electromagnetic driving parts D11 and D12 and second electromagnetic driving parts D21 and D22 (for example, providing other first electromagnetic driving parts D11 and D12 on the other sidewalls of the holder 30 that have not been used, and providing other second electromagnetic driving parts D21 and D22 at the corners between the four sidewalls of the frame 40) and by changing the number and position of the holder connection portions 62A of the upper spring sheet 60, it is also possible to achieve the correction/compensation for 6 axes, 7 axes, or more axes.

It should also be understood that, in the above-mentioned embodiments, the first coil C1 of the focus driving unit and the first electromagnetic driving parts D11 and D12 of the tilt driving unit are disposed on the holder 30 together, and the first electromagnetic driving parts D11 and D12 and the first coil C1 are partially overlapping when viewed along the optical axis O. Moreover, the focus driving unit, the anti-shaking unit, and the tilt driving unit share the second electromagnetic driving parts D21 and D22, that is, the first coil C1 of the focus driving unit, the second coils C21 and C22 of the anti-shaking unit, and the first electromagnetic driving parts D11 and D12 (driving coils) of the tilt driving unit all correspond to the second electromagnetic driving parts D21 and D22 (multi-polar magnets). Therefore, the number of parts, the assembly process, and product size are effectively reduced.

Figure 9A:
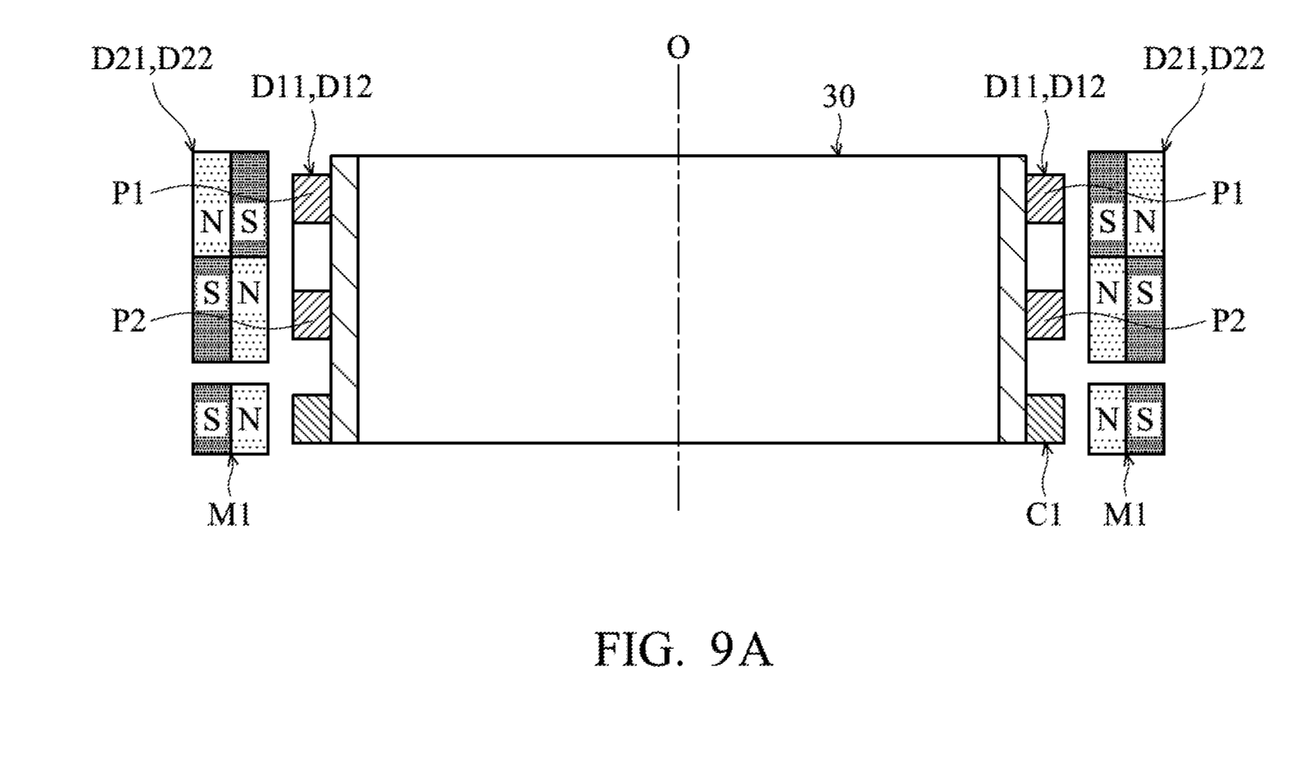
FIGS. 9A and 9B are schematic views showing the multi-polar magnets in FIG. 7 are divided into several magnetic elements in accordance with some embodiments of the invention.

In some embodiments, the focus driving unit and the tilt driving unit do not share the second electromagnetic driving parts D21 and D22 (multi-polar magnets), as shown in FIG. 9A. The embodiment of FIG. 9A differs from the embodiment of FIG. 7 in that the focus driving unit includes several (for example, four) first magnetic elements M1 (for example, ordinary magnets having two poles). Specifically, the first magnetic elements M1 are respectively mounted on opposite sides of the frame 40 (FIG. 1) and correspond to the second electromagnetic driving parts D21 and D22 (multi-polar magnets) of the tilt driving unit. The first magnetic elements M1 and the second electromagnetic driving parts D21 and D22 are separated from each other. Note that each of the second electromagnetic driving parts D21 and D22 in FIG. 7 may be regarded as a single multi-polar magnet that is formed by integrating each of the first magnetic elements M1 and the respective second electromagnetic driving part D21 or D22 (multi-polar magnets) in FIG. 9A in one piece.

In some embodiments, the number of first magnetic elements M1 is one or more. In some embodiments, the focus driving unit includes several first coils C1 disposed on the holder 30, respectively corresponding to the first magnetic elements M1, and the first coils C1 each have an elliptical structure. In some embodiments, the pole directions of the first magnetic elements M1 located on opposite sides of the holder 30 are the same or opposite, and the current flowing into the first coils C1 disposed on opposite sides of the holder 30 have the same or opposite current directions, accordingly. In some embodiments, the second electromagnetic driving parts D21 and D22 (multi-polar magnets) located on opposite sides of the holder 30 have the same or opposite magnetic domain configuration with respect to the adjacent first electromagnetic driving parts D11 and D12 (driving coils), and the current flowing into the first electromagnetic driving parts D11 and D12 located on opposite sides of the holder 30 have the same or opposite current directions, accordingly. In some embodiments, the first electromagnetic driving parts D11 and D12 of the tilt driving unit mounted on the holder 30 are driving magnets (for example, multi-polar magnets), and the second electromagnetic driving parts D21 and D22 mounted on the frame 40 are driving coils (for example, elliptical driving coils).

Figure 9B:
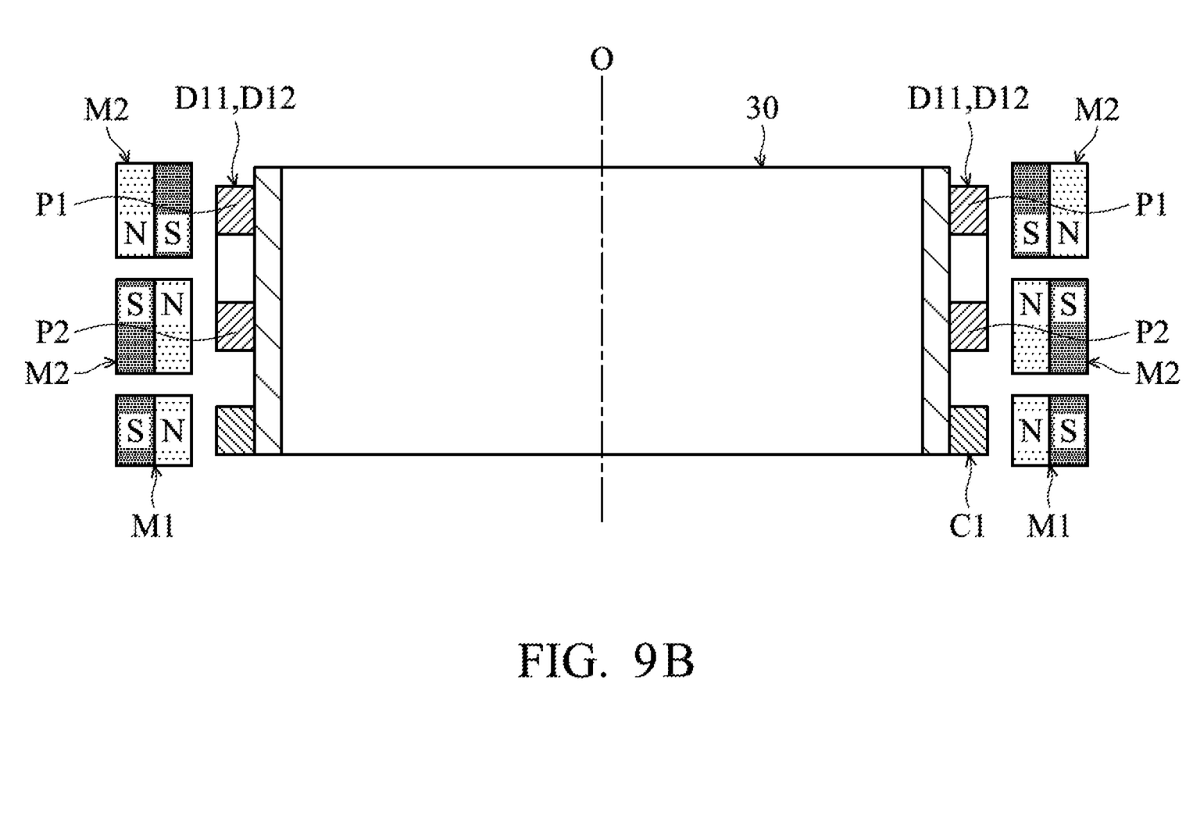

Referring to the embodiment shown in FIG. 9B, each of the second electromagnetic driving parts D21 and D22 is changed from a multi-polar magnet (see FIG. 9A) to two separated ordinary magnets M2. It can be seen from FIG. 9B that the two ordinary magnets M2 have opposite pole directions and respectively correspond to the upper half portion P1 and the lower half portion P2 of the first electromagnetic driving parts D11 and D12 (elliptical driving coils).

Although not shown, the anti-shaking unit in the embodiments shown in FIG. 9A and FIG. 9B may share the first magnetic elements M1 of the focus driving unit, or share the second electromagnetic driving parts D21 and D22 (multipolar magnets) or the ordinary magnets M2 of the tilt driving unit.

Figure 10:
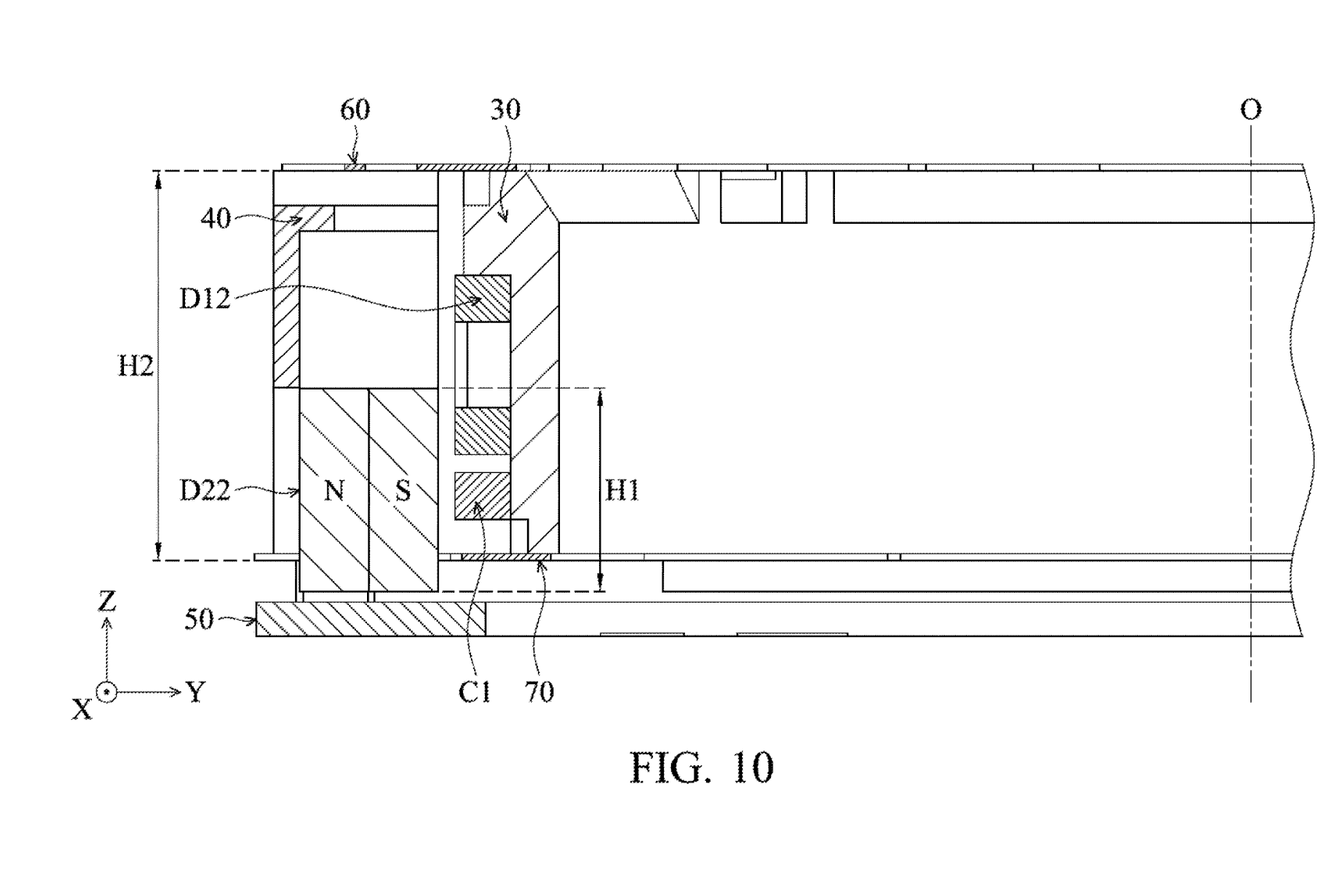
FIG. 10 is a schematic view showing that the multi-polar magnets in FIG. 7 are changed to ordinary magnets, to reduce the height of the frame, in accordance with another embodiment.

Referring to FIG. 10, in some embodiments, each of the second electromagnetic driving parts D21 and D22 (driving magnets; the second electromagnetic driving parts D21 cannot be seen in FIG. 10 due to the restricted viewing angle) of the tilt driving unit mounted on the frame 40 is changed from a multi-polar magnet to a single ordinary magnet having two poles. It can be seen from FIG. 10 that the second electromagnetic driving parts D21 and D22 (ordinary magnets) each have one magnetic domain in the direction of the optical axis O, and the magnetic domain corresponds to the lower half portion P2 of the respective first electromagnetic driving part D11 or D12 (driving coil; the first electromagnetic driving parts D11 cannot be seen in FIG. 10 due to the restricted viewing angle) and the first coil C1 of the focus driving unit. Although not shown, the second coils of the anti-shaking unit, the first coil C1 of the focus driving unit, and the first electromagnetic driving parts D11 and D12 (driving coils) of the tilt driving unit also correspond to the second electromagnetic driving parts D21 and D22 (ordinary magnets) in this embodiment. For example, the first coil C1 and each of the first electromagnetic driving parts D11 and D12 (driving coils) correspond to one face of the respective second electromagnetic driving part D21 or D22 (ordinary magnet), and the face is parallel to the optical axis O (see FIG. 10). Moreover, each of the second coils corresponds to another face of the respective second electromagnetic driving part D21 or D22 (ordinary magnet), and the other face is perpendicular to the optical axis O.

With the above features, the embodiment of FIG. 10 can also achieve the focusing function of the focus driving unit and the rotation correction/compensation function of the tilt driving unit in the above-mentioned embodiments (FIGS. 1 to 9). Moreover, the second coils (formed in the substrate 50 and not shown) of the anti-shaking unit and the second electromagnetic driving parts D21 and D22 (ordinary magnets) may also generate electromagnetic induction, so that the frame 40 is moved respect to the substrate 50 and the base 20 (see FIG. 1 and FIG. 3) along the direction perpendicular to the optical axis O, thereby achieving horizontal offset compensation and suppressing image blur due to shock. It should be understood that, in the embodiment shown in FIG. 10, the height H1 of the second electromagnetic driving parts D21 and D22 in the direction of the optical axis O is reduced (compared with the height of the second electromagnetic driving parts D21 and D22 in FIG. 3), and hence the height H2 of the frame 40 can also be reduced accordingly, thereby facilitating miniaturization of the lens driving device.

In addition, each of the second electromagnetic driving parts D21 and D22 (ordinary magnets) in the embodiment shown in FIG. 10 may be regarded a single ordinary magnet that is formed by omitting the ordinary magnet M2 corresponding to the upper half portion P1 of the first electromagnetic part D11 or D12 in the embodiment of FIG. 9B and by integrating the ordinary magnet M2 (driving magnet) corresponding to the lower half portion P2 of the first electromagnetic part D11 or D12 and the respective first magnetic element M1 (ordinary magnet) in one piece. Therefore, the production cost, the assembly process, and product weight can also be reduced. In some embodiments, the second electromagnetic driving parts D21 and D22 (ordinary magnets) are also changed to ordinary magnets M2 (corresponding to the lower half portion P2 of the first electromagnetic parts D11 and D12) and the first magnetic elements M1 separated from each other.

As described above, the embodiments of the invention have at least one additional electromagnetic driving part disposed on the holder. Specifically, the electromagnetic driving part and the other respective electromagnetic driving part on the frame can generate electromagnetic induction, so that the holder and the lens therein are tilted (i.e. rotated) with respect to the base, thereby achieving the correction/compensation for the rotation of the lens about at least one rotation axis (for example, the X or Y axis). Furthermore, the focus driving unit and the anti-shaking unit of the lens driving device in the embodiments may share the electromagnetic driving parts on the frame, and hence the number of parts, the assembly process, production cost, and product size are reduced.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens driving device, comprising:
   a base;
   a frame movably connected to the base;
   a holder used to carry a lens and movably disposed in the frame;
   a focus driving unit including at least one first coil and at least one first magnetic element, the first coil being disposed on the holder, the first magnetic element being disposed on the frame and corresponding to the first coil, and electromagnetic induction occurs between the first coil and the first magnetic element, so that the holder is moved along an optical axis of the lens with respect to the base; and
   a tilt driving unit including a plurality of first electromagnetic driving parts and a plurality of second electromagnetic driving parts, the first electromagnetic driving parts being disposed on opposite sides of the holder, the second electromagnetic driving parts being disposed on the frame and corresponding to the first electromagnetic driving parts, and electromagnetic induction occurs between the first and second electromagnetic driving parts, so that the holder is tilted with respect to the base.

2. The lens driving device as claimed in claim 1, wherein the first electromagnetic driving parts are driving coils each having an elliptical structure, and the second electromagnetic driving parts are driving magnets.

3. The lens driving device as claimed in claim 2, wherein the first coil and the first electromagnetic driving parts are disposed on the holder and are partially overlapping when viewed along the optical axis.

4. The lens driving device as claimed in claim 2, wherein the focus driving unit includes a plurality of first magnetic elements disposed on opposite sides of the frame and corresponding to the driving magnets of the tilt driving unit.

5. The lens driving device as claimed in claim 4, wherein the driving magnets are multi-polar magnets, and each of the first magnetic elements and the respective driving magnets are integrally formed in one piece as a multi-polar magnet.

6. The lens driving device as claimed in claim 5, wherein the multi-polar magnet has a plurality of magnetic domains of different sizes in the direction of the optical axis, and the driving coil corresponding to the multi-polar magnet has an upper half portion and a lower half portion which correspond to the magnetic domains, respectively.

7. The lens driving device as claimed in claim 2, wherein the current flowing into the driving coils disposed on opposite sides of the holder have the same or opposite current directions.

8. The lens driving device as claimed in claim 1, further comprising an elastic member connecting the holder to the frame, wherein the elastic member includes a plurality of holder connection portions connected to the holder, and the holder connection portions located on opposite sides of the holder determine at least one rotation axis of the holder.

9. The lens driving device as claimed in claim 8, wherein the rotation axes are arranged in a cross shape, and the optical axis passes through an intersection of the rotation axes.

10. The lens driving device as claimed in claim 4, wherein the driving magnets are ordinary magnets, and each of the first magnetic elements and the respective driving magnet are integrally formed in one piece as an ordinary magnet, wherein the ordinary magnet has one magnetic domain in the direction of the optical axis, and the magnetic domain corresponds to the first coil and a portion of the respective driving coil.

11. The lens driving device as claimed in claim 5, further comprising a substrate disposed on the base, wherein the substrate has a plurality of second coils corresponding to the multi-polar magnets, respectively, and electromagnetic induction occurs between the second coils and the multi-polar magnets, so that the frame is moved along a direction perpendicular to the optical axis with respect to the base.

12. The lens driving device as claimed in claim 10, further comprising a substrate disposed on the base, wherein the substrate has a plurality of second coils corresponding to the ordinary magnets, respectively, and electromagnetic induction occurs between the second coils and the ordinary magnets, so that the frame is moved along a direction perpendicular to the optical axis with respect to the base.

13. The lens driving device as claimed in claim 11, wherein the first coil, the first electromagnetic driving parts, and the second coils correspond to the multi-polar magnets.

14. The lens driving device as claimed in claim 13, wherein the first coil and each of the first electromagnetic driving parts correspond to a face of the respective multi-polar magnet which is parallel to the optical axis.

15. The lens driving device as claimed in claim 14, wherein each of the second coils corresponds to another face of the respective multi-polar magnet which is perpendicular to the optical axis.

16. The lens driving device as claimed in claim 1, further comprising a plurality of suspension wires for suspending the frame and the holder therein on the base.

17. The lens driving device as claimed in claim 1, further comprising an elastic member which is a spring sheet having a plurality of spring sheet portions, wherein the spring sheet portions are electrically connected to the first coil of the focus driving unit and electrically connected to the first electromagnetic driving parts of the tilt driving unit.

18. The lens driving device as claimed in claim 9, further comprising a plurality of stopper mechanisms formed between the frame and the holder, and the stopper mechanisms are arranged in another cross shape.

19. The lens driving device as claimed in claim 18, wherein the cross shape formed by the stopper mechanisms and the cross shape formed by the rotation axes do not overlap, and have an angle therebetween, the angle not being zero.

20. The lens driving device as claimed in claim 9, wherein the rotation axes are parallel to or perpendicular to the faces of the second electromagnetic driving parts corresponding to the first electromagnetic driving parts.

* * * * *